United States Patent [19]
Kitajima et al.

[11] Patent Number: 6,087,645
[45] Date of Patent: Jul. 11, 2000

[54] REMOTE CONTROLLABLE LASER PROJECTION APPARATUS

[75] Inventors: Eiichi Kitajima; Hiroshi Kishimoto, both of Yokohama, Japan

[73] Assignee: Nikon Corporation, Tokyo, Japan

[21] Appl. No.: 09/081,207

[22] Filed: May 20, 1998

[30]  Foreign Application Priority Data

May 20, 1997  [JP]  Japan ................................. 9-129681

[51] Int. Cl.[7] ............................................. G01B 11/26
[52] U.S. Cl. ........................ 250/203.1; 250/206.1; 33/DIG. 21; 356/141.1
[58] Field of Search ............... 250/206.1, 203.1, 250/234; 33/DIG. 21, 286, 281, 291; 356/138, 139.07, 141.1

[56]  References Cited

U.S. PATENT DOCUMENTS

| | | | |
|---|---|---|---|
| 5,583,685 | 12/1996 | Ohtomo et al. | 250/234 |
| 5,610,711 | 3/1997 | Rando | 356/141.1 |
| 5,898,490 | 4/1999 | Ohtomo et al. | 356/141.1 |
| 5,907,907 | 6/1999 | Ohtomo et al. | 33/DIG. 21 |
| 6,011,613 | 1/2000 | Ohtomo et al. | 356/139.07 |

*Primary Examiner*—Stephone B. Allen
*Attorney, Agent, or Firm*—Pillsbury Madison & Sutro LLP

[57]  ABSTRACT

An inexpensive remote-controllable laser projection apparatus projects a laser light onto a target object that is located at a prescribed distance from the laser projection apparatus. The laser projection apparatus includes a main body and a remotely controllable reflection target. The main body includes a projection means for projecting the laser light, a reflected light detection means for detecting the reflected light of the projected laser light, a controller, which is connected to the projection means and the reflected light detection means, for controlling the projection of the laser light in multiple operation modes. The reflection target is placed at a position that is separated from the main body, on which prescribed reflection patterns for reflecting the projected laser light are formed. The controller detects, via the reflected light detection means, the patterns of the reflected light which are generated by the reflection patterns formed on the reflection target, and the controller identifies and selects the operation mode based on the detected patterns of the reflected light.

19 Claims, 7 Drawing Sheets

Fig. 7 SCAN MODE

Fig. 8 ROTATION MODE

Fig. 9 MANUAL FOCUS MODE

REMOTE CONTROLLABLE LASER PROJECTION APPARATUS

BACKGROUND OF THE INVENTION

1. Field of the Invention

The present invention relates in general to a remote-controllable laser projection apparatus. More particularly, the present invention provides a laser projection apparatus for projecting laser light onto an object, scanning the object, and forming horizontal lines, vertical lines, and oblique lines in order to use these lines for inking.

2. Description of Related Art

Laser projection apparatuses are widely used on construction sites, for example, to mark a horizontal line at a prescribed height on an indoor wall. Such a laser projection apparatus generates visible laser light and projects it via an optical system. A standard laser projection apparatus generally operates in distinct modes: 1) focus mode 2) rotation mode, and 3) scan mode.

During focus mode operation, the position of the focal point of the laser light is adjusted in response to the distance between the apparatus and a target object. The optical system for projecting is adjusted to sharpen the projection image of the laser light on the target object as much as possible.

In rotation mode, the laser light is rotated 360 degrees. The standard laser projection apparatus adjusts the rotation speed of the optical system, and forms a linear image that is suitable to be inked (marked) via. the residue image effect of the laser light on the target object. For example, when the target object is located far from the laser projection apparatus, the rotation speed of the optical system needs to be controlled below a certain level in order to secure a satisfactory level of luminance on the target object. On the other hand, when the target object is located near the laser projection apparatus, the standard laser projection apparatus can form a linear image of high luminance by increasing the rotation speed of the optical system. In the scan mode, the standard laser projection apparatus forms an image suitable for inking on the target object by, for example, adjusting the angular scan range at a constant rotation speed. If the target object is located far from the standard laser projection apparatus, the standard laser projection apparatus in the scan mode restricts the scan range in order to form an image suitable for inking on the target object.

During scan mode the laser light scans repeatedly within the range of a prescribed angle, and the like. Typically an operator of a standard laser projection apparatus manually selects or switches among operation modes and adjusts the operation parameters as the operator observes the image of the laser light on the target object.

However, since the target object is located at a predetermined distance from the laser projection apparatus, the operator needs to go toward the target object to observe the image of the laser light near the target object, and then return to the laser projection apparatus to adjust the laser projection apparatus by giving appropriate control signals to the laser projection apparatus. Since the operation mode needs to be switched or adjusted frequently, operation is very inefficient.

In order to control the laser projection apparatus, a remote controller that uses infrared light or radio waves can be used instead of the above-explained manual control method. However, such a remote controller is expensive, and thus undesirable.

SUMMARY OF THE INVENTION

Given these circumstances, it is an object of the present invention to provide a laser projection apparatus that can be easily remote-controlled.

It is another object of the present invention to provide an inexpensive remote-controlled laser projection apparatus that can be easily operated in various operation modes and adjust operating parameters for each operation mode.

To achieve these objectives, there is provided a laser projection apparatus having a main body and a remote-controllable reflection target. The main body contains a laser light projector for projecting laser light onto a remotely located target object, a reflected light detector for detecting laser light reflected from the target to the main body, and a controller, which is connected to the laser light projector and the reflected light detector, for controlling laser light projection in multiple operation modes. The reflection target, located at a position remote from the main body, has a prescribed reflection pattern for reflecting the projected laser light. The controller determines from the pattern of light reflected from the target the operation mode in which the projector is operating.

According to the present invention, for each operation mode, the laser projection apparatus changes the reflection pattern of the reflection target, which reflects the laser light that has been projected and scanned from the laser projection apparatus, and the laser projection apparatus thereby forms a reflection pattern that corresponds to the parameter of the operation mode. In this way, the laser projection apparatus changes the pattern of the reflected light. The pattern of the reflected light is decoded on the laser projection apparatus side, and is used as a remote control signal.

DETAILED DESCRIPTION OF THE INVENTION

Preferred embodiments of the present invention will now be explained in detail with reference to the drawings. It should be understood, however, that these embodiments are examples. The range of technical applications of the present invention should not be limited to these preferred embodiments.

Figure 1:
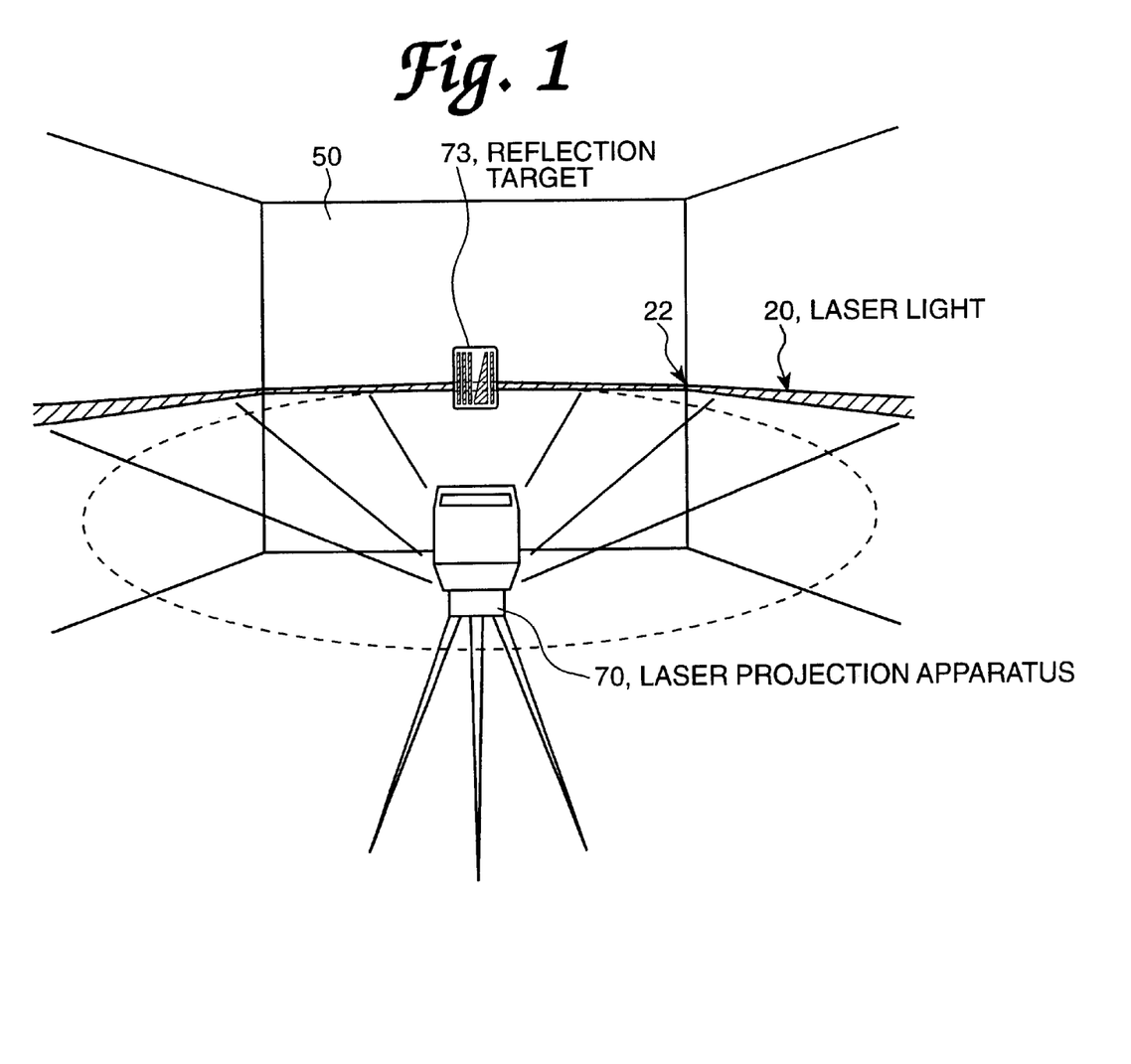
FIG. 1 shows an embodiment of the laser projection apparatus according the present invention.

FIG. 1 shows an embodiment of the laser projection apparatus according to the present invention. A laser projection apparatus 70 is shown installed horizontally on the floor of an indoor construction site. The laser projection apparatus 70 projects a visible laser light 20 onto a wall 50, which is the target object. The laser light 20 is rotated 360 degrees at a prescribed angular speed, and a horizontal line 22 is formed by the image of the laser light on the wall 50. The operator of the laser projection apparatus marks the wall along the horizontal line formed by the image of the laser light. In this way, horizontal lines, vertical lines, oblique lines, and the like can be formed on the surface of the target object by changing the inclination of the laser projection apparatus.

Laser projection apparatuses of this type are known. One example is disclosed in Japanese Patent Application Laid-Open No. H6-20138, incorporated by reference herein as if fully set forth. Laser projection apparatus 70 includes a semiconductor laser diode for emitting a visible laser light, an optical system for projecting the laser light in a horizontal direction, and a rotation motor for rotating a prism installed in the optical system.

A reflection target 73 is installed at a position onto which the laser light is projected. A prescribed reflection pattern is formed on the surface of the reflection target 73. The laser projection apparatus 70 scans the reflection target 73 with the laser light, detects the pattern of the reflected light that has been reflected by the reflection target 73, and decodes the reflection pattern formed on the reflection target 73.

Then, based on the decoded reflection pattern, the laser projection apparatus 70 is caused to operate in a particular operating mode and in accordance with operation parameters that are appropriate. The operation parameters could be default parameters or parameters called for by a message encoded in the reflection pattern received by the laser projection apparatus 70. An operator standing near the wall 50, which is the target object, holds the reflection target 73 on which multiple reflection patterns are formed, and adjusts the position of the reflection target 73 so that the projected laser light will illuminate a desired reflection pattern. Light reflected from the target, so positioned, will then carry a coded message based on the target selected and the portion of the target illuminated by the projected laser light. Information carried by the light reflected back to the laser projection apparatus 70 is decoded to identify the reflection pattern of the reflected laser light. The decoded message is used to control the operation of the laser projection apparatus.

Figure 2:
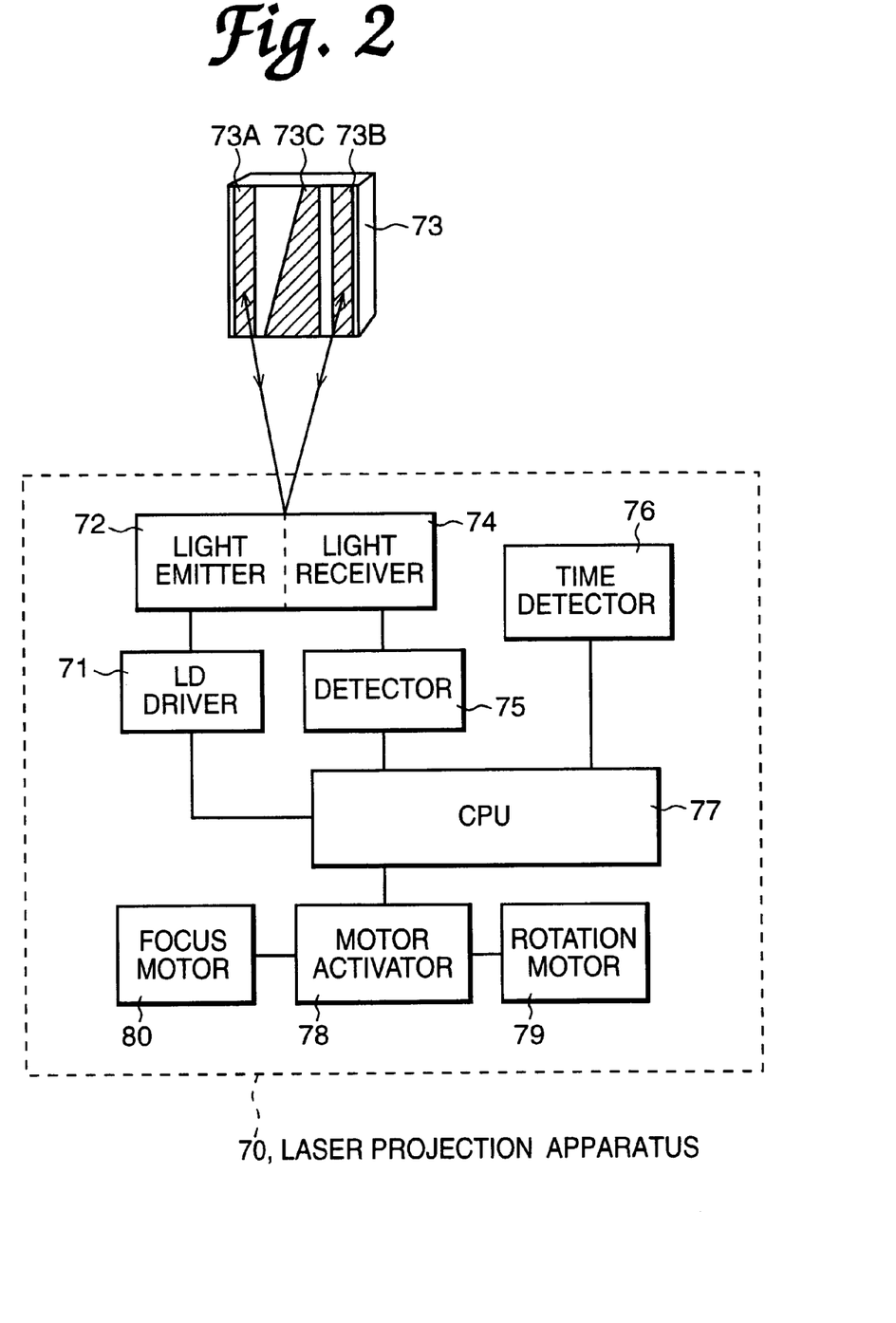
FIG. 2 is a block diagram showing the internal structure of the laser projection apparatus according the present invention.

FIG. 2 is a block diagram showing the major functional blocks of the laser projection apparatus 70. The laser projection apparatus 70 contains a controller 77 preferably constituted by a CPU, such as a microcomputer. Of course there are alternatives to using a microcomputer—such as using a hard-wired logic circuit, etc. A laser diode activator 71 activates a laser emitter 72 having a laser diode for emitting a laser light. An optical system, not shown, projects laser light from emitter 72 toward the target object. Together, laser diode activator 71, laser emitter 72, and the optical system (not shown) constitute a laser projection means. The laser projection apparatus 70 also contains a light receiver 74 having a photodiode for receiving the reflected laser light. A detector 75 converts the reflected laser light, which the receiver 74 has received, into an electric signal having a prescribed form.

A motor activator 78, controlled by CONTROLLER 77 controls a focus motor 80 and a rotation motor 79 for controlling the optical system. Focus motor 80 operates the lens system of the optical system and rotation motor 79 drives a prism of the optical system causing the laser light to rotate within the room in which the laser projection apparatus is installed. A time detector 76 detects the pulse width of the reflected light, as will be explained in detail later.

FIG. 2 also shows the reflection target 73 on which reflection patterns 73A, 73B and 73C are formed. In this example, the reflection patterns 73A, 73B and 73C determine an operation mode, for example, the rotation mode. The width of the reflection pattern 73C gradually changes. Note that it is narrower at the top of the target than at the bottom of the target. In this example, the reflection pattern 73C controls the parameter of rotation speed in the rotation mode, which will be explained in detail later.

Figure 3:
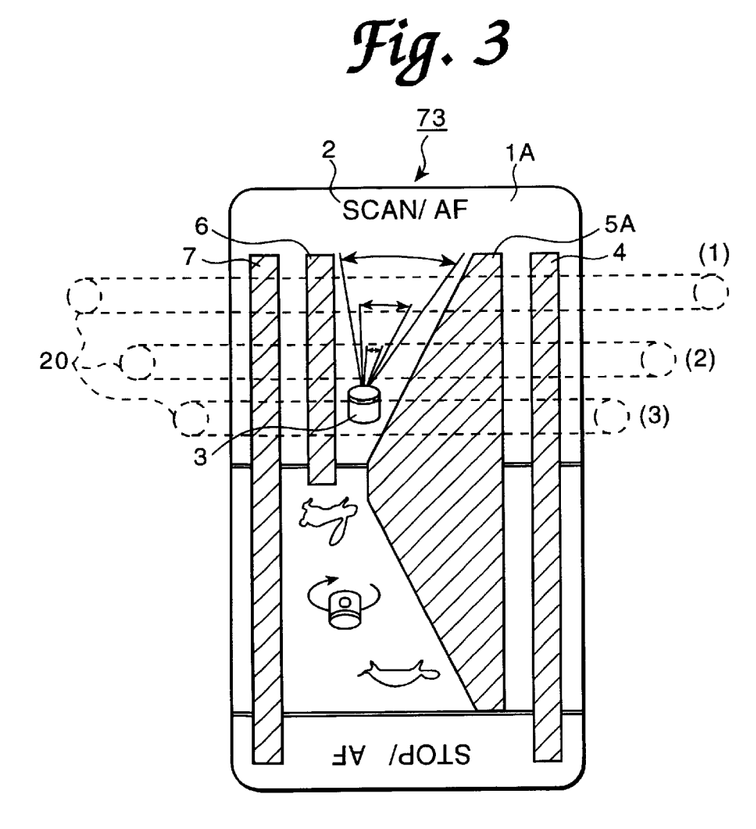
FIG. 3 shows the first example of a reflection target, being used in the scan mode.

FIG. 3 shows a first example of the reflection target 73. In this example, a label 2, here "SCAN/AF", indicating the operation mode, and a picture 3 indicating the scan mode, are printed on upper half of the surface 1A of a base board made of, for example, resin. In addition, in this example, band-shaped reflection-patterns 4 and 7 are installed along both ends of the surface 1A. In this preferred embodiment, each of these reflection patterns is a micro-prism consisting of, for example, multiple micro-corner cubes, which reflects the laser light in the direction in which the laser light has been emitted, regardless of the injection angle of the laser light. The reflection patterns can be formed at a low cost by using micro-prisms or the like. However, there are other suitable ways to form the reflection patterns.

In the example shown in FIG. 3, the upper half of the surface 1A is used for the scan mode. Therefore, a band-shaped reflection pattern 6 and a wedge-shaped reflection pattern 5A are formed on the upper half of the surface 1A. The scan mode is indicated by the four reflection patterns 4, 5A, 6 and 7. The reciprocation angle of the laser light to be projected is controlled by the positional relation between the wedge-shaped reflection pattern 5A and the laser light 20. For example, as the laser light 20 crosses the wedge-shaped reflection pattern 5A at positions (1), (2), and (3), respectively, in FIG. 3, the laser light 20 crosses the increasing widths of the wedge-shaped reflection pattern 5A. By a method to be explained later, the controller 77 inside the laser projection apparatus detects the width of the wedge-shaped reflection pattern 5A at positions (1), (2), and (3).

In addition, the position of the focal point of the optical system of the laser projection apparatus can be automatically adjusted by using the band-shaped reflection patterns 4 and 7 that are formed on both sides of the surface 1A. As disclosed in Japanese Patent Application Laid-Open No. H6-20138, incorporated herein by reference as if fully set forth herein, the distance from the optical system to the target object can be calculated from the distance between the reflected light that has been reflected by the reflection pattern 4 and the reflected light that has been reflected by the reflection pattern 7, and the rotation speed of the laser light. Therefore, the position of the focal point of the optical system can be automatically adjusted in accordance with the distance from the optical system to the target object.

Figure 4:
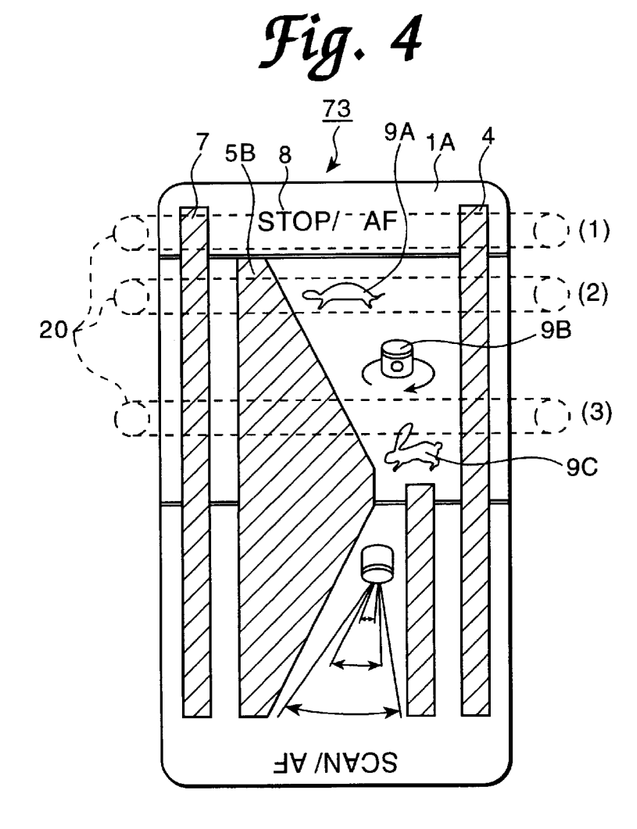
FIG. 4 shows the second example of a reflection target, being used in the rotation mode.

FIG. 4 shows a second example of the reflection target 73. Here, the lower half of the reflection target 73 shown in FIG. 3 is used for the rotation mode. In this example, a label 8 displaying "STOP/AF", a picture 9B indicating the rotation mode, a picture 9A of a turtle indicating a low rotation speed, and a picture 9C of a rabbit indicating a high rotation speed are depicted are on the surface 1A. The band-shaped reflection patterns 4 and 7 on both sides of the surface 1A and the wedge-shaped reflection pattern 5B to be used for adjusting the rotation speed are also formed on the surface 1A.

In this example, the reflection patterns 4, 5B, and 7 correspond to the rotation mode. The rotation speed is adjusted based on the illumination position of the laser light 20 with respect to the wedge-shaped reflection pattern 5B. The distance from the optical system to the reflection target is measured based on the reflection patterns 4 and 7, and is used for the auto-focus operation. In addition, in this example, when the laser light is projected from position (1) in FIG. 4, two pulses of the reflected light are detected, and the rotation is stopped.

Figure 5:
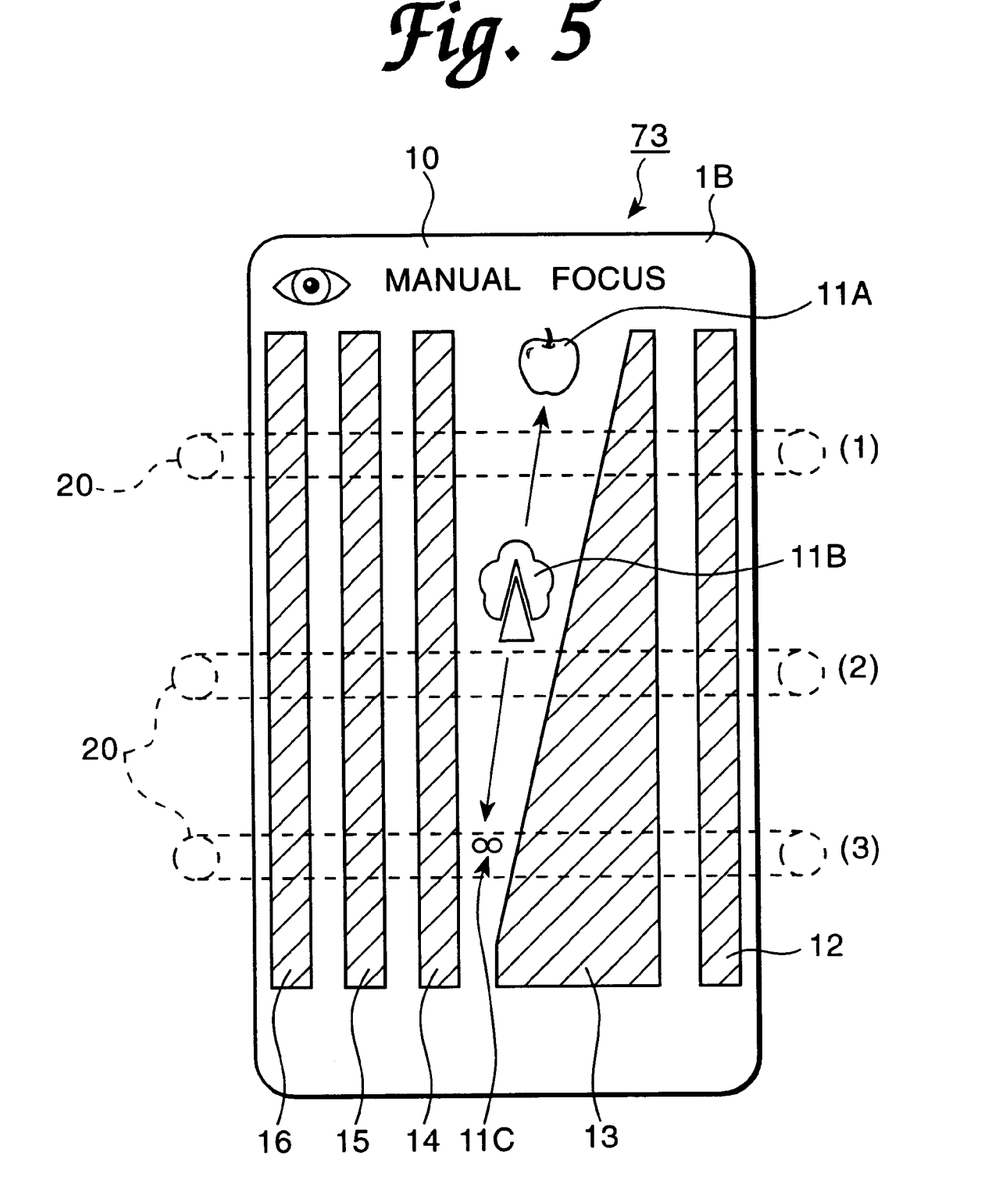
FIG. 5 shows the third example of a reflection target, being used in the manual focus mode.

FIG. 5 shows a third example of the reflection target 73. In this case, the reverse side 1B of the reflection target shown in FIGS. 3 and 4 is used for the manual focus mode. Four band-shaped reflection patterns 12, 14, 15, and 16, and a wedge-shaped reflection pattern 13 are formed on the reverse side 1B. In addition, a label 10 displaying MANUAL FOCUS, a picture 11A of an apple indicating a short distance, a picture 11B of an apple tree indicating an intermediate distance, and a symbol 11C of infinity indicating a long distance are printed on the reverse side 1B.

The reflection targets thus formed for these three operation modes may be installed on a single plate or on three separate plates.

Figure 6:
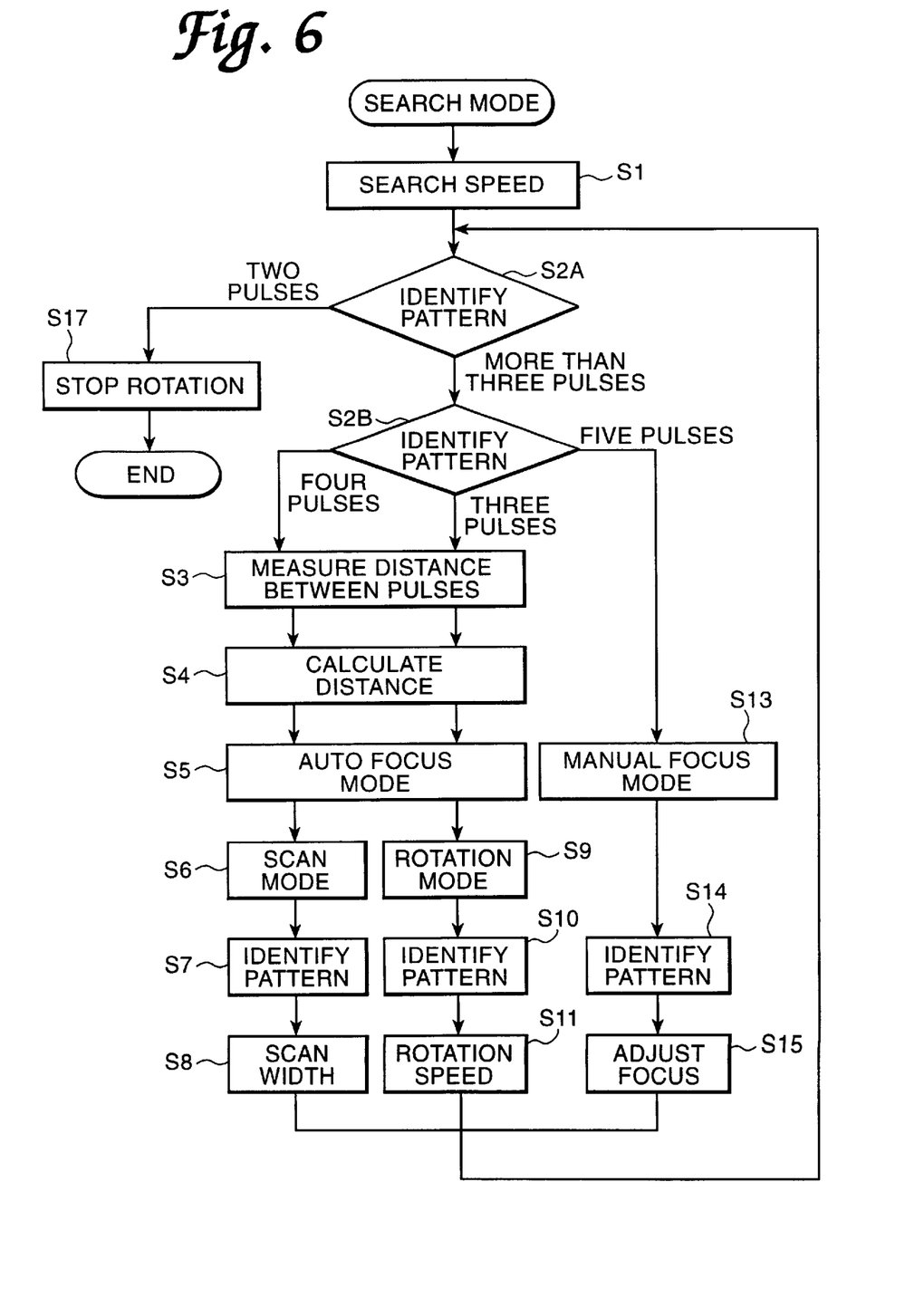
FIG. 6 is a flow chart showing the remote control operation of the laser projection apparatus in the case in which reflection targets formed for the three operation modes of FIGS. 3, 4, and 5 are used.

FIG. 6 is a flow chart showing how remote control operation is carried out using the reflection target 73 for the three operation modes as explained above. A control program is stored in a ROM associated with controller 77, which controls the detection and selection of each operation mode and adjustment of operating parameter(s) for the respective modes.

When the laser projection apparatus is turned on, the search mode is automatically activated, and a laser light, which rotates at a constant search speed, starts scanning (S1). At this stage, the operator of the laser projection apparatus adjusts the reflection target so that the laser light will pass through the reflection patterns that correspond to the desired operation mode.

The laser projection apparatus receives the laser light that is reflected by the reflection target. Then, for example, the number of the received light pulses is detected. In other words, first it is judged whether the number of the pulses is two or greater than three (S2A).

If the number of the pulses is greater than three, then the number is further detected (S2B). As a result, in the above-described example, the stop mode is identified when the number of the pulses is two, the rotation mode is identified when the number of the pulses is three, the scan mode is identified when the number of the pulses is four, and the manual focus mode is identified when the number of the pulses is five. When the number of the pulses is different from two through five, it is judged to be an error, and nothing is processed.

Figure 7:
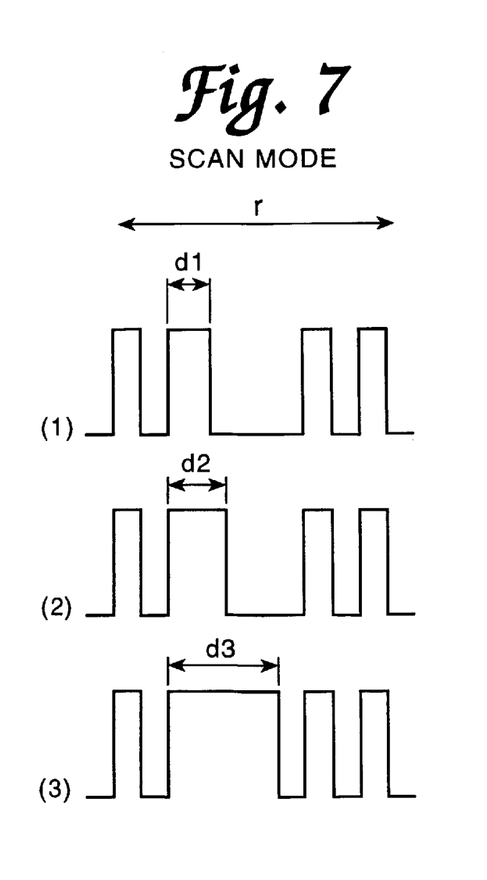
FIG. 7 shows an example of a received pulse signal that is detected when a reflection target 73 is used in the scan mode shown in FIG. 3.

FIG. 7 shows an example of received pulse signals that are detected when the reflection target 73 is used in the scan mode, as was explained in reference to FIG. 3. FIG. 7 (1), (2), and (3) show the pulse signals of the received light when the laser light 20 scans the positions (1), (2), and (3) shown in FIG. 3, respectively.

Each of the pulse signals of the received light has four pulses, indicating the scan mode. Returning to FIG. 6, the time lag r, shown in FIG. 7, between the pulse signal of the received light that corresponds to the reflection pattern 4 and the pulse signal of the received light that corresponds to the reflection pattern 7 is detected (S3). Then based on the detected time lag r and the search speed of the laser light, the distance from the laser projection apparatus to the reflection target that is placed on the target object is calculated (S4). In accordance with the calculated distance, the controller 77 drives the focus motor 80 of the optical system using the motor driver, and sets the focal point of the optical system at the target object (S5). As a result, the laser light 20 is most sharply projected onto the target object.

At this stage, the operator of the laser projection apparatus observes the image of the laser light on the target object, and changes the widths d1, d2, and d3 of the second pulse of the received light, which are shown in FIG. 7, by vertically moving the reflection target 73.

In this way, the operator adjusts the angular scan range (reciprocation scan angle) of the laser light. The time detector 76 of the controller 77 detects the pulse width d. In accordance with the width d, the controller 77 adjusts the angular range of motion (reciprocation angle) of the rotation motor 79 (S6, S7, and S8). Then return to S2A.

Figure 8:
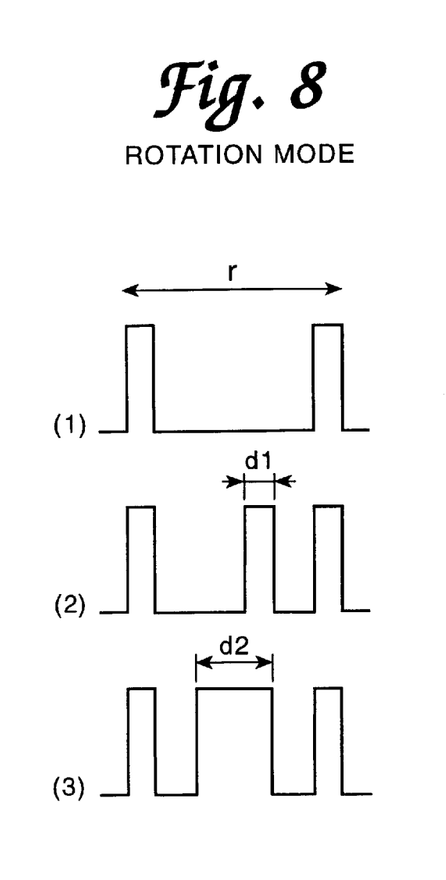
FIG. 8 shows an example of a received pulse signal that is detected when a reflection target 73 is used in the rotation mode shown in FIG. 4.

FIG. 8 shows an example of a pulse signal of the received light that is detected when the reflection target 73 is used in the rotation mode, as was explained in reference to FIG. 4. FIG. 8 (1), (2), and (3) show the pulse signals of the received light when the laser light 20 scans positions (1), (2), and (3) of FIG. 4, respectively.

Each received light pulse signal has three or two pulses, indicating the rotation mode or stop mode. If the stop mode has been identified, the rotation scan is stopped (S17), and the search mode process is ended. The above-mentioned rotation scan also includes the aforementioned reciprocating scan in the scan mode. If the rotation mode has been identified, as in the above-described manner, the rotation speed of the laser light is adjusted based on the widths d1 and d2 of the middle pulse of the received light. Therefore, the operator is able to remote-control adjust the rotation speed of the laser light by vertically moving the reflection target 73 up and down. (S9, S10, and S11). Then return to S2A.

In the stop mode, a laser beam spot is projected onto the target object. Its horizontal direction position can be adjusted, for example, by giving a driving command by manual operation to the rotation motor 79.

Figure 9:
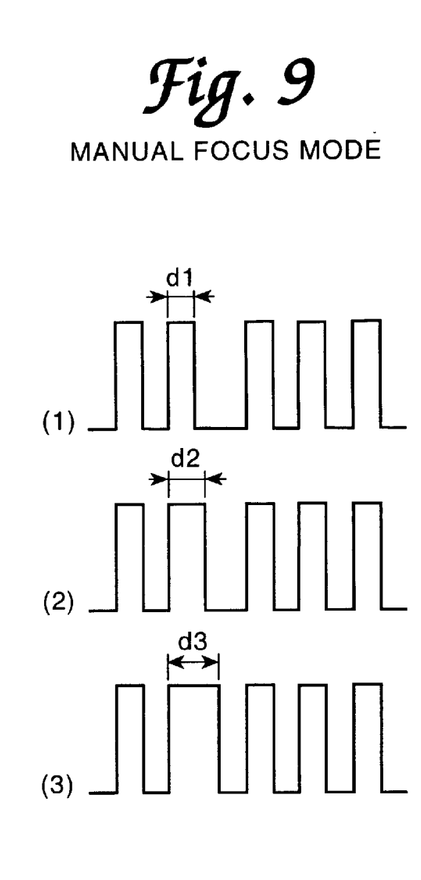
FIG. 9 shows an example of a received pulse signal that is detected when a reflection target 73 is used in the manual focus mode shown in FIG. 5.

FIG. 9 shows an example of a pulse signal of the received light that is detected when the reflection target 73 is used in the manual focus mode, as was explained with reference to FIG. 5. FIG. 9 (1), (2), and (3) show the pulse signals of the received light when the laser light 20 scans positions (1), (2), and (3) of FIG. 5, respectively. Then return to S2A.

Each of the pulse signals of the received light shown in FIG. 9 has five pulses, indicating the manual focus mode. In the manual focus mode, the operator manually adjusts the position of the focal point of the optical system of the laser projection apparatus by vertically moving the reflection target. Based on the width of the second pulse shown in FIG. 9, the controller 77 drives the focus motor 80 by activating the motor activator 78. As the position for inking changes, the focus of the optical system is micro-adjusted, and the sharpness of the image of the laser light on the target object is adjusted (S13, S14, and S15).

Figure 10:
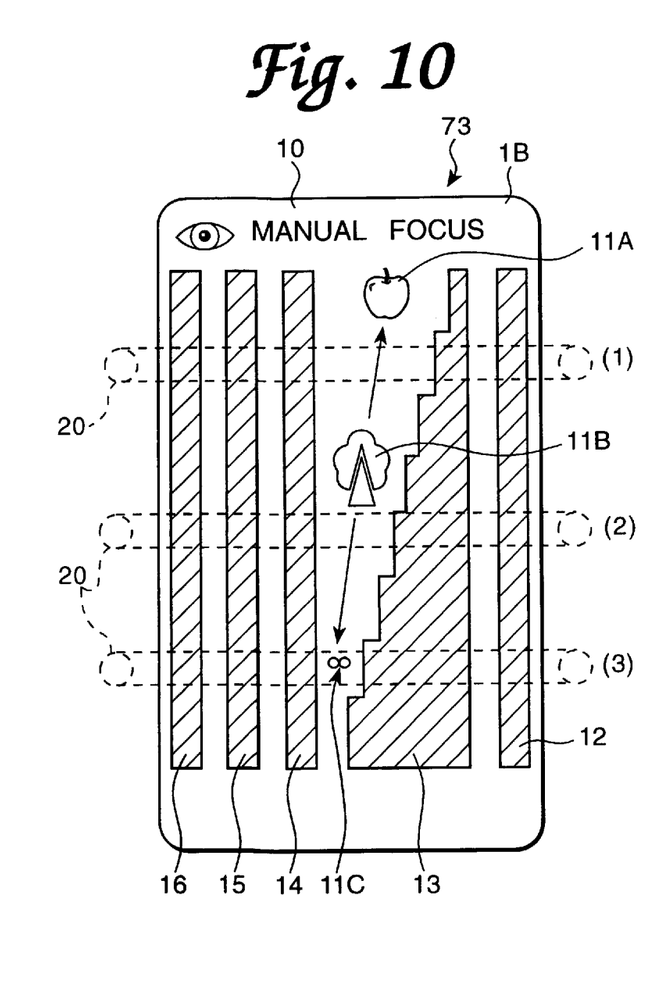
FIG. 10 shows a fourth example of the reflection target according to the present invention.

FIG. 10 shows a fourth example of the reflection target 73. In this example, reflection patterns that correspond to the manual focus mode are formed on the reflection target 73. In this example also, there are five reflection patterns formed on the reflection target 73. The width of the focus adjustment pattern 13 changes in eight stepwise increments. As a result, the focus of the optical system is adjusted in steps. The region through which the laser light 20 passes at each step is sufficiently large that the operation efficiency is improved. In each step, since the width of the respective pattern is large in comparison with the beam width of the laser beam 20 that scans the reflection target, the scan speed of the laser beam does not change even if the position of the reflection target is displaced vertically to some extent. Therefore, the position of the reflection pattern can be easily adjusted, improving the operation performance.

Figure 11:
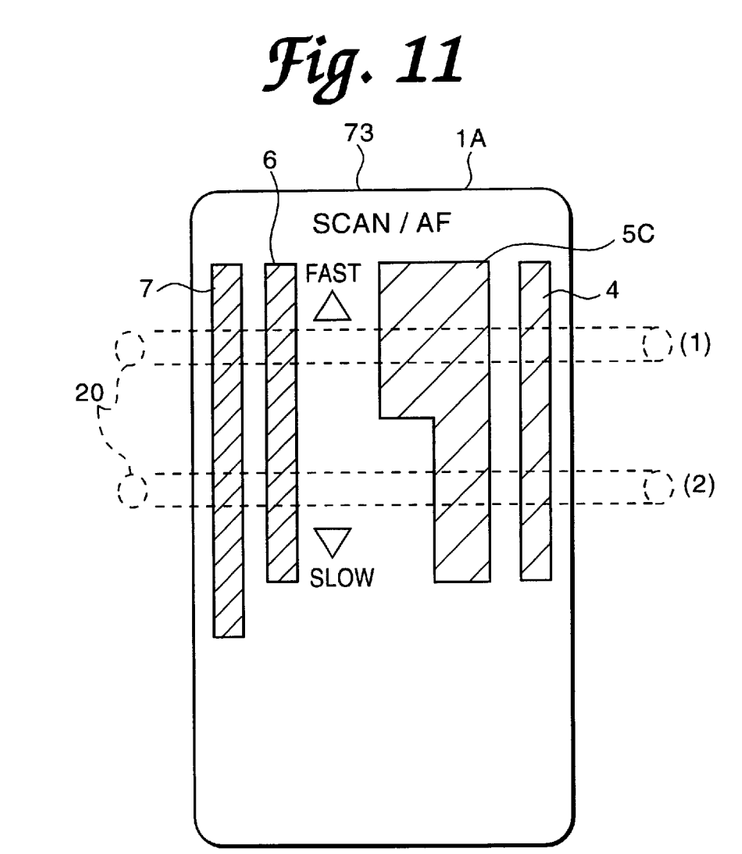
FIG. 11 shows a fifth example of the reflection target according to the present invention.

FIG. 11 shows a fifth example of the reflection target 73. In this example, reflection patterns that correspond to the scan mode are formed on the reflection target 73. The four reflection patterns 4, 5C, 6, and 7 indicate the scan mode. In this example, the reflection pattern 5C for adjusting the angular range of motion of the optical system (reciprocation angle) has a wide portion indicating that the reciprocation angle will be increased, and a narrow portion indicating that the reciprocation angle will be decreased, though the present invention is not limited to such a formation of the reflection pattern 5C. When the controller 77 detects a pulse signal of the received light from the wide portion of the reflection pattern 5C, the controller 77 increases the reciprocation angle by a prescribed digital amount. When the controller 77 detects a pulse signal of the received light from the narrow portion of the reflection pattern 5C, the controller 77 decreases the reciprocation angle by a prescribed digital amount. Then the controller 77 detects the width of the pulse at a prescribed sampling timing. In this way, the operator is able to adjust the operation parameters more efficiently.

The rotation speed of the laser light in the rotation mode and the position of the focal point of the optical system in the manual focus mode can also be adjusted digitally.

According the present invention, the operator can select the operation mode, and adjust the parameter of each operation mode by remote control, using the reflection target which has relatively inexpensive reflection patterns. Therefore, a laser projection apparatus which operates with a high degree of efficiency can be provided at a low cost.

What is claimed is:

1. A laser projection apparatus, comprising:
    a main body including:
        a laser projector for projecting laser light toward an object;
        a detector for detecting laser light reflected back toward the main body; and
        a controller, connected to the projector and the detector, for controlling the projector to operate in any of a plurality of projection modes of operation; and
    a remote-controllable reflection target, positioned in proximity to the object and away from the main—body, on which prescribed reflection patterns are formed, for reflecting projected laser light;
    wherein the controller detects patterns of the reflected light, which are generated by the reflection patterns formed on the reflection target, via the reflected light detection means, and identifies an operation mode based on the detected patterns of the reflected light.

2. A laser projection apparatus as claimed in claim 1, wherein the reflection target has a plurality of reflection patterns corresponding to respective modes of operation and a plurality of parameter patterns for providing prescribed parameters in the respective operation modes.

3. A laser projection apparatus as claimed in claim 1, wherein the plurality of operation modes includes a rotation mode for rotating the laser light, a scan mode for reciprocating the laser light within a prescribed angular range, and a focus mode for adjusting the position of the focal point of the projected laser light.

4. A laser projection apparatus as claimed in claim 3, wherein the reflection target operates in the rotation mode, in which the operation mode reflection patterns rotate the laser light and the parameter pattern corresponds to the rotation speed of the laser light.

5. A laser projection apparatus as claimed in claim 3, wherein the reflection target operates in the scan mode, in which the operation mode reflection patterns cause the laser light to reciprocate within a prescribed angular range and the parameter pattern corresponds to the reciprocation angle of the laser light.

6. A laser projection apparatus as claimed in claim 3, wherein the reflection target operates in the focus mode in which the operation mode reflection patterns adjust the position of the focal point of the projected laser light and the parameter pattern corresponds to the position of the focal point of the projected laser light.

7. A laser projection apparatus according to claim 2, wherein the width of each parameter pattern gradually increases or decreases from one point of the pattern to another.

8. A laser projection apparatus according to claim 4 wherein the width of each of the parameter patterns gradually increases or decreases from one point of the pattern to another.

9. A laser projection apparatus according to claim 5 wherein the width of each of the parameter patterns gradually increases or decreases from one point of the pattern to another.

10. A laser projection apparatus according to claim 6 wherein the width of each of the parameter patterns gradually increases or decreases from one point of the pattern to another.

11. A method of controlling a laser projection apparatus, comprising the steps of:
    projecting from the laser projection apparatus capable of being operated in various operating modes, a laser beam toward a target;
    causing the laser beam to be reflected back to the projection apparatus, the reflected beam being reflected with a predetermined pattern corresponding to a desired operating mode of the projection apparatus;
    detecting, at the projection apparatus, the reflected pattern; and
    causing the projection apparatus to operate in a desired one of a plurality of possible operating modes automatically in response to the reflected pattern.

12. A method according to claim 11, wherein the step of reflecting comprises the step of reflecting from one of a plurality of reflection patterns on the target corresponding to respective modes of operation and from one of a plurality of parameter patterns for providing prescribed parameters in the respective operation modes.

13. A method according to claim 11, wherein the plurality of operation modes include a rotation mode for rotating the laser light, a scan mode for reciprocating the laser light within a prescribed angular range, and a focus mode for adjusting the position of the focal point of the projected laser light.

14. A method according to claim 13, wherein the reflection target operates in the rotation mode, in which the operation mode reflection patterns rotate the laser light and the parameter pattern corresponds to the rotation speed of the laser light.

15. A method according to claim 13, wherein the reflection target operates in the scan mode, in which the operation mode reflection patterns cause the laser light to reciprocate within a prescribed angular range and the parameter pattern corresponds to the reciprocation angle of the laser light.

16. A method according to claim 13, wherein the reflection target operates in the focus mode in which the operation mode reflection patterns adjust the position of the focal point of the projected laser light and the parameter pattern corresponds to the position of the focal point of the projected laser light.

17. A method according to claim 12, wherein reflection occurs from a parameter pattern that gradually increases or decreases from one point along the pattern to another.

18. A laser projection apparatus for projecting a laser light onto a target object that is positioned at a prescribed distance, comprising:

a main body unit having a light projection device for projecting the laser light, a reflected light detection device for detecting a reflected light of the projected laser light, and a control unit, which is connected to the light projection device and reflected light detection device, for controlling the projection of the laser light; and a remote controllable reflection target on which a prescribed reflection pattern for reflecting the projected laser light is formed, which is installed at a position removed from the main body unit, wherein the control unit detects via the reflected light detecting device the reflected light pattern that the reflection pattern of the reflection target has reflected, and controls the projection of the laser beam in accordance with the detected reflected light pattern.

19. A remote controllable reflection target for use with a laser projection apparatus having a light projection device for projecting a laser light toward a target object that is located at a prescribed distance, a reflected light detection device for detecting a reflected light of the projected laser light, and a control unit, which is connected to the light projection device and reflected light detection device, for controlling the projection of the laser light in response to a signal that is supplied from the reflected light detection device, wherein a reflection pattern that corresponds to the signal for controlling the projection of the laser light is formed on the reflection target.

* * * * *